US010051281B2

(12) United States Patent
Zhou et al.

(10) Patent No.: US 10,051,281 B2
(45) Date of Patent: Aug. 14, 2018

(54) VIDEO CODING SYSTEM WITH EFFICIENT PROCESSING OF ZOOMING TRANSITIONS IN VIDEO

(71) Applicant: Apple Inc., Cupertino, CA (US)

(72) Inventors: Xiaosong Zhou, Campbell, CA (US);
Hsi-Jung Wu, San Jose, CA (US);
Chris Y. Chung, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 370 days.

(21) Appl. No.: 14/284,701

(22) Filed: May 22, 2014

(65) Prior Publication Data

US 2015/0341654 A1    Nov. 26, 2015

(51) Int. Cl.
| | |
|---|---|
| *H04N 7/12* | (2006.01) |
| *H04N 11/02* | (2006.01) |
| *H04N 11/04* | (2006.01) |
| *H04N 19/50* | (2014.01) |
| *H04N 19/105* | (2014.01) |
| *H04N 19/172* | (2014.01) |
| *H04N 19/142* | (2014.01) |
| *H04N 19/87* | (2014.01) |
| *H04N 19/59* | (2014.01) |

(52) U.S. Cl.
CPC ........... *H04N 19/50* (2014.11); *H04N 19/105* (2014.11); *H04N 19/142* (2014.11); *H04N 19/172* (2014.11); *H04N 19/59* (2014.11); *H04N 19/87* (2014.11)

(58) Field of Classification Search
CPC ...................................................... H04N 19/59
See application file for complete search history.

(56) References Cited

U.S. PATENT DOCUMENTS

| | | | |
|---|---|---|---|
| 8,135,068 B1 * | 3/2012 | Alvarez ............... | H04N 19/176 375/240.12 |
| 2008/0247462 A1 * | 10/2008 | Demos ................. | H04N 19/597 375/240.03 |
| 2009/0003446 A1 | 1/2009 | Wu et al. | |
| 2009/0141808 A1 * | 6/2009 | Wong ............ | H04N 21/440272 375/240.25 |
| 2011/0090963 A1 * | 4/2011 | Po .......................... | H04N 19/46 375/240.16 |
| 2012/0033039 A1 | 2/2012 | Sasaki et al. | |
| 2012/0106642 A1 | 5/2012 | Letunovskiy et al. | |
| 2012/0114036 A1 * | 5/2012 | Po .......................... | H04N 19/50 375/240.12 |
| 2012/0134415 A1 * | 5/2012 | Lin ........................ | H04N 19/52 375/240.16 |
| 2013/0089154 A1 * | 4/2013 | Chen ...................... | H04N 19/70 375/240.25 |
| 2013/0223523 A1 * | 8/2013 | Moghadam .......... | H04N 19/172 375/240.03 |

(Continued)

*Primary Examiner* — Rebecca Volentine
(74) *Attorney, Agent, or Firm* — Baker & Hostetler LLP

(57) ABSTRACT

A video coder, responsive to detection of a zooming transition in source video, estimates a scale factor and a zooming rectangle for a reference frame, scales content of the reference frame within the zooming rectangle according to the scaling factor, codes content of a new frame of the source video predictively using the scaled reference frame as a basis of prediction, and transmits coded video data obtained from the predictive coding to a decoder along with an indication of the scaling factor and zooming rectangle.

29 Claims, 7 Drawing Sheets

(56) References Cited

U.S. PATENT DOCUMENTS

| | | | |
|---|---|---|---|
| 2013/0294516 A1* | 11/2013 | Guduru | H04N 19/172 375/240.16 |
| 2013/0315311 A1* | 11/2013 | Song | H04N 19/00606 375/240.16 |
| 2014/0002742 A1* | 1/2014 | Chamaret | H04N 5/14 348/571 |
| 2014/0112389 A1* | 4/2014 | Wahadaniah | H04N 19/597 375/240.12 |
| 2014/0241437 A1* | 8/2014 | Seregin | H04N 19/105 375/240.24 |
| 2015/0117540 A1* | 4/2015 | Morimoto | H04N 19/52 375/240.16 |
| 2016/0255354 A1* | 9/2016 | Yamamoto | H04N 19/70 375/240.12 |

\* cited by examiner

100

300

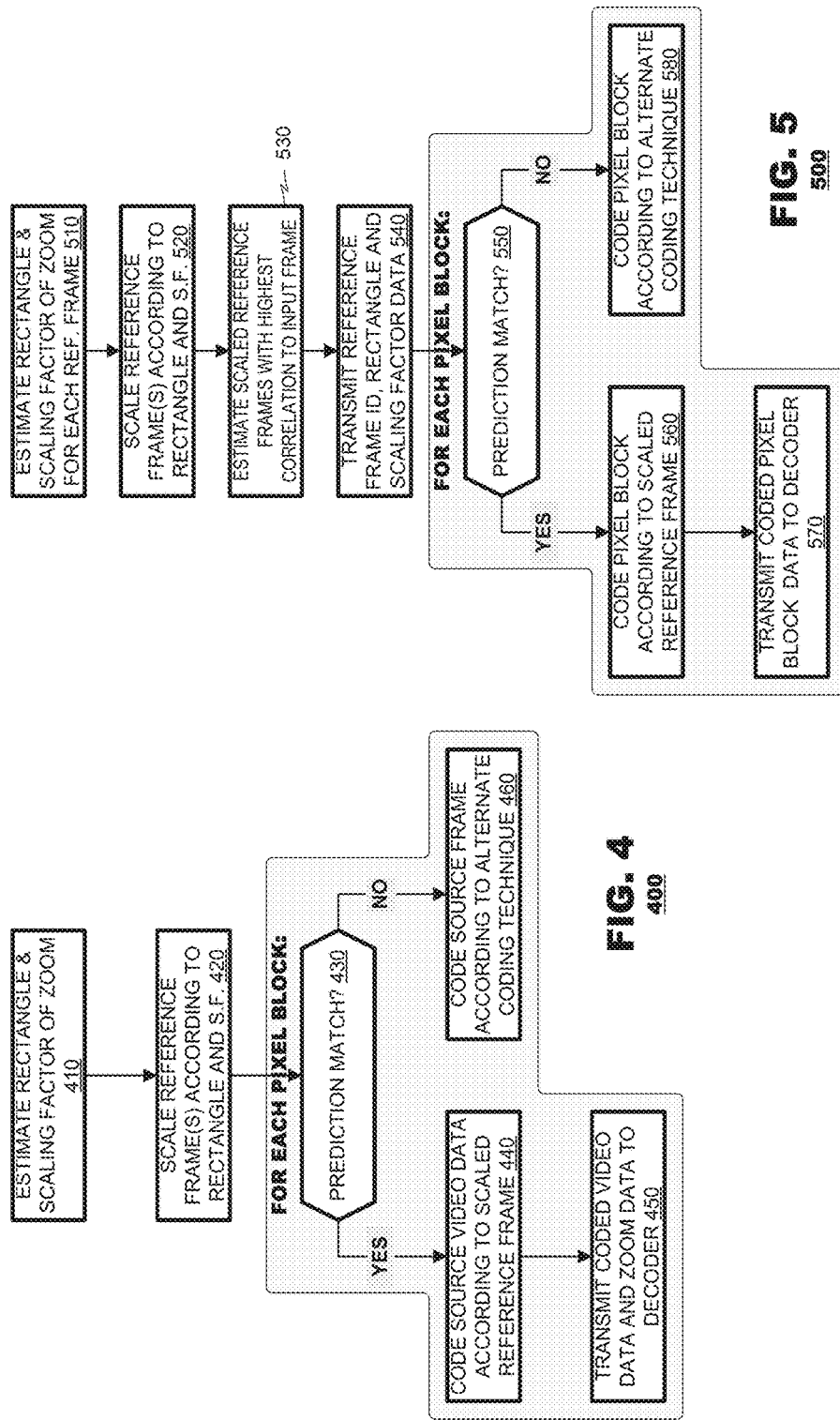

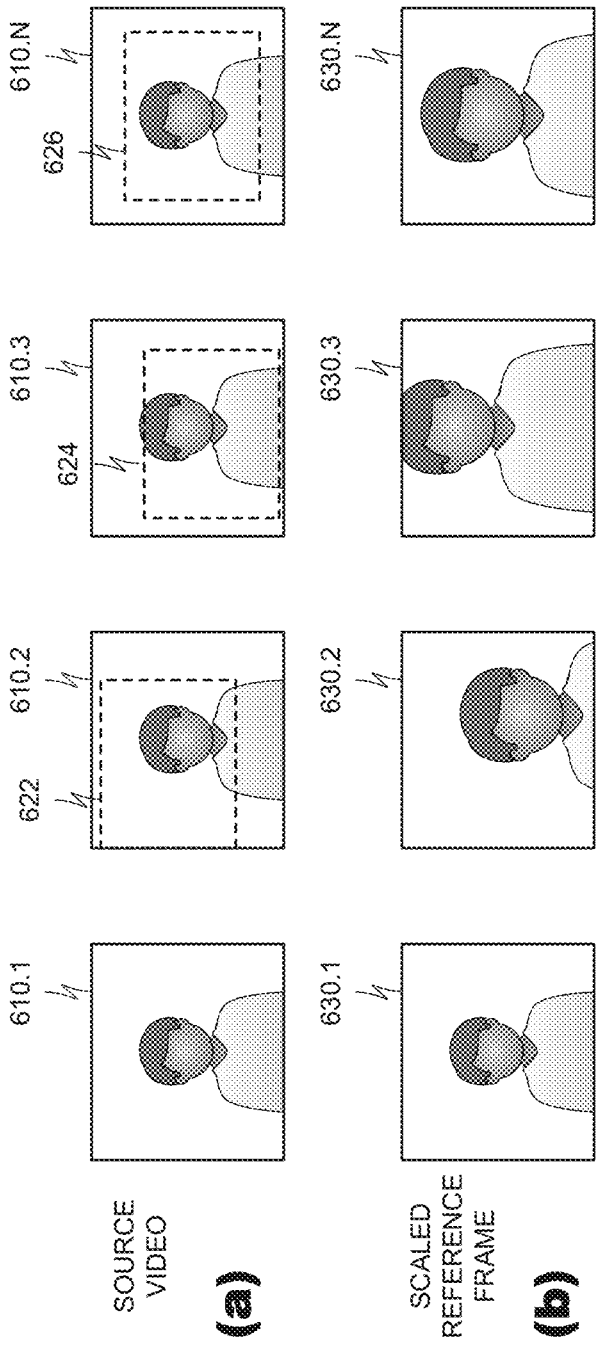

700

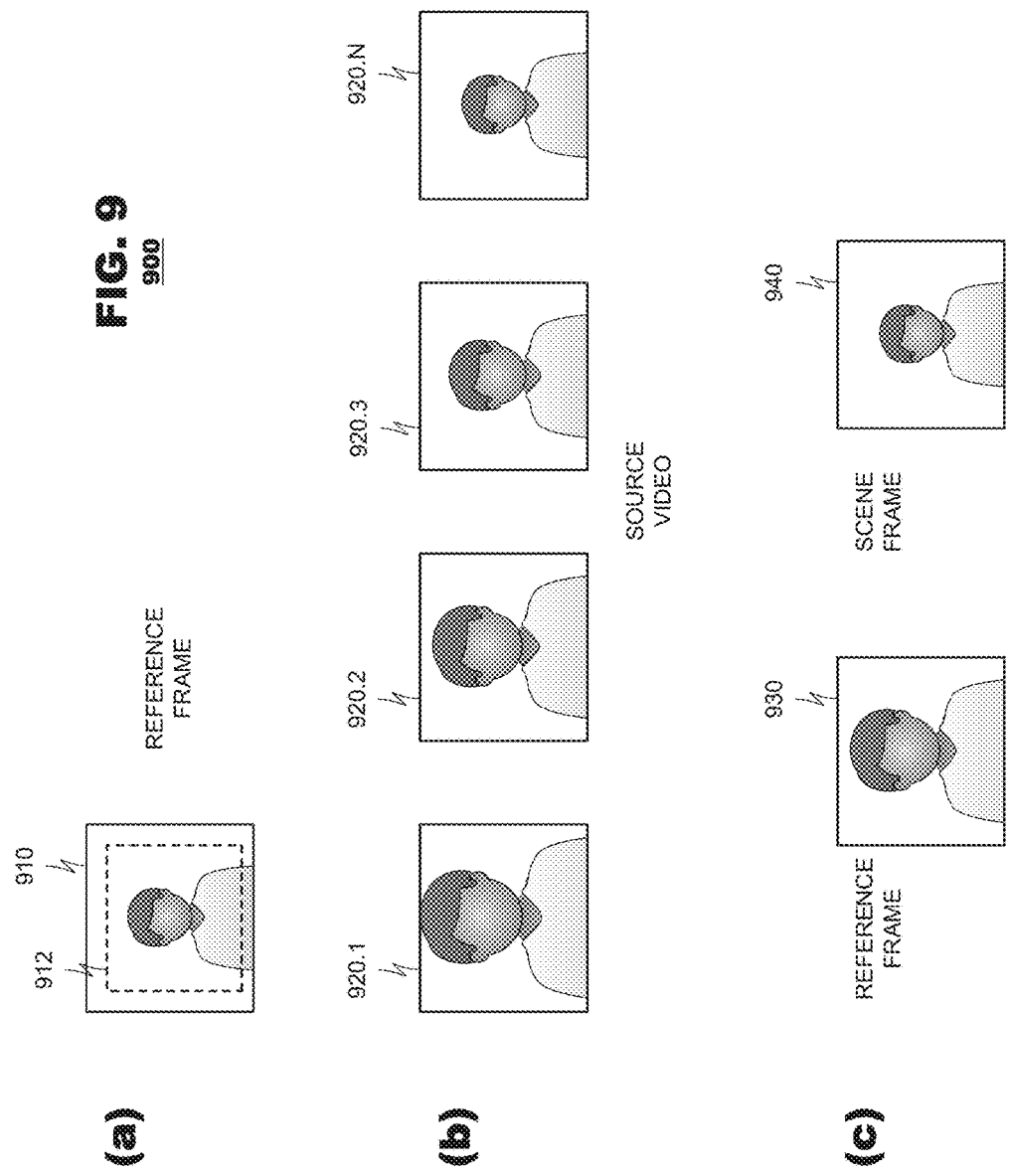

VIDEO CODING SYSTEM WITH EFFICIENT PROCESSING OF ZOOMING TRANSITIONS IN VIDEO

BACKGROUND

Modern multimedia systems often employ predictive coding techniques to accommodate transmission of video in a bandwidth-limited channel, such as wireline networks, wireless networks and even storage devices (such as optical disk systems). Predictive coding techniques reduce bandwidth of a source video sequence by exploiting spatial and/or temporal redundancies in the source video. For example, content of one frame may be coded using one or more other frames as a source of prediction. Such techniques can be efficient when there is strong temporal and/or spatial correlation among frames.

Temporal prediction, for example, endeavors to predict a frame with reference to one or more "reference frames." Reference frames are frames that have been coded by an encoder, transmitted in a channel and, by the time a given frame is to be decoded, already decoded by a decoder. The reference frames also are decoded by the encoder so the encoder and decoder have common copies of the decoded reference frames. Thereafter, for a new frame to be coded, an encoder may search among the locally-stored reference frames to determine which frames, if any, provide good sources of prediction for content in the new frame. The prediction search often is performed at granularities smaller than a frame, for example, after the frame has been parsed into sub-units (called "pixel blocks" herein). When a prediction match is found, the encoder may transmit an identification of the matching content in the bit stream, and then code differences between content in the new frame and content in the reference frame from which the prediction reference is made.

Zooming transitions can interfere with prediction search operations. Zooming transitions can occur when image content in a field of view increases or decreases during a portion of a video sequence. Although temporal correlation exists between the frames, the changing size of image content can interfere with an encoder's ability to develop a prediction match between a frame being coded and one or more reference frames.

The inventors perceive a need in the art to develop coding techniques to code a video sequence predictively when zooming transitions occur in the sequence.

BRIEF DESCRIPTION OF THE DRAWINGS

FIG. 4 illustrates a coding method according to an embodiment of the present invention.

FIG. 5 illustrates a coding method according to another embodiment of the present invention.

FIG. 6 illustrates exemplary video data and prediction data to be obtained therefrom according to an embodiment of the present invention.

FIG. 9 illustrates exemplary video data according to an embodiment of the present invention.

DETAILED DESCRIPTION

Embodiments of the present invention provide coding techniques for video data in which, responsive to detection of a zooming transition in source video, a scale factor and a zooming rectangle for a reference frame may be estimated, content of the reference frame within the zooming rectangle may be scaled according to the scaling factor, content of a new frame of the source video may be predictively coded using the scaled reference frame as a basis of prediction, and coded video data obtained from the predictive coding may be transmitted to a decoder along with an indication of the scaling factor and zooming rectangle.

Figure 1:
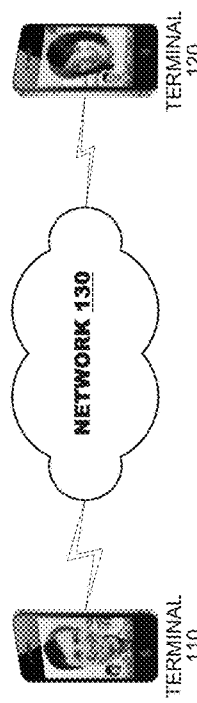
FIG. 1 is a simplified block diagram of an encoder/decoder system according to an embodiment of the present invention.

FIG. 1 is a simplified block diagram of an encoder/decoder system 100 according to an embodiment of the present invention. The system 100 may include first and second terminals 110, 120 interconnected via a network 130. The terminals 110, 120 may exchange coded video data with each other via the network 130, either in a unidirectional or bidirectional exchange. For unidirectional exchange, a first terminal 110 may capture video data from local image content, code it and transmit the coded video data to a second terminal 120. The second terminal 120 may decode the coded video data that it receives and display the decoded video at a local display. For bidirectional exchange, each terminal 110, 120 may capture video data locally, code it and transmit the coded video data to the other terminal. Each terminal 110, 120 also may decode the coded video data that it receives from the other terminal and display it for local viewing.

Although the terminals 110, 120 are illustrated as smartphones in FIG. 1, they may be provided as a variety of computing platforms, including servers, personal computers, laptop computers, tablet computers, media players and/or dedicated video conferencing equipment. The network 130 represents any number of networks that convey coded video data among the encoder 110 and decoder 120, including, for example, wireline and/or wireless communication networks. A communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless discussed hereinbelow.

Figure 2:
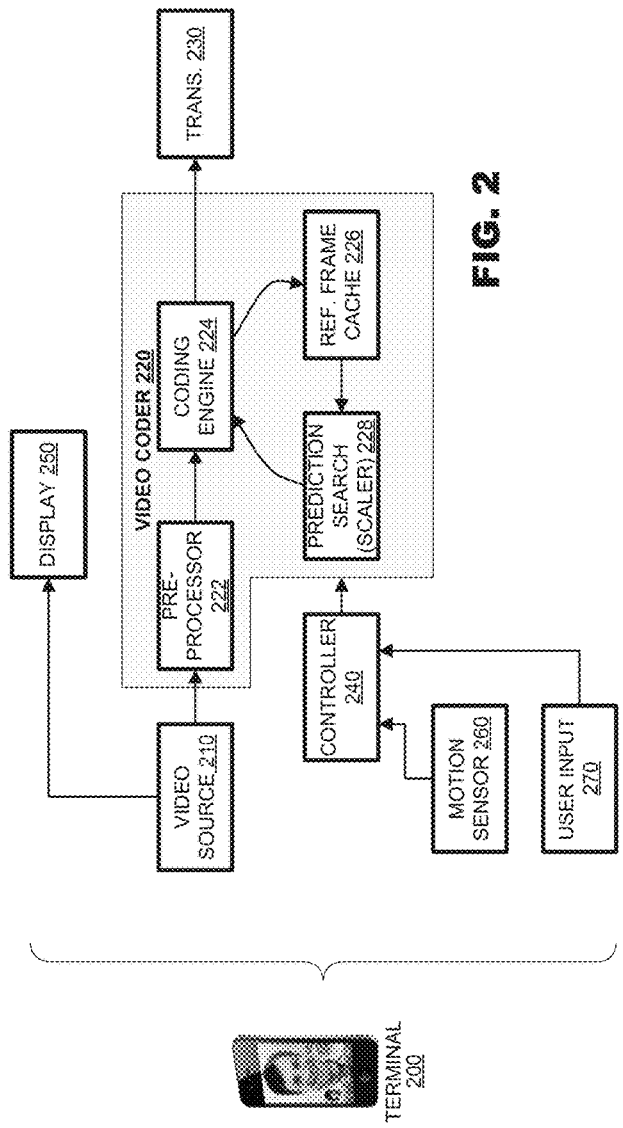
FIG. 2 is a functional block diagram of a terminal according to an embodiment of the present invention.

FIG. 2 is a functional block diagram of a terminal 200 that performs video coding according to an embodiment of the present invention. The terminal 200 may include a video source 210, a video coder 220, a transmitter 230 and a controller 240. The video source 210 may generate a video sequence for coding. Typical video sources 210 include electronic cameras that generate video from locally-captured image information and/or storage devices in which video may be stored, e.g., for media serving applications. Thus, source video sequences may represent naturally occurring image content or synthetically generated image content (e.g., computer generated video) as application needs warrant. The video source may provide source video to other components within the terminal 200.

The video coder 220 may code frames of video data according to reduce bandwidth of the source video. In an embodiment, the video coder 220 may include a pre-processor 222, a coding engine 224, a reference frame cache 226 and a predictor 228. The pre-processor 222 may perform processing operations on the source video to condition it for coding by the coding engine 224. Typical pre-processing may include filtering operations that alter the spatial and/or temporal complexity of the source video, resizing operations that alter the size of frames within the source video and frame rate conversion operations that alter the frame rate of the source video. Such pre-processing operations may vary dynamically according to operating states of the terminal 200, operating states of the network 130 (FIG. 1) and/or operating states of a second terminal 120 (FIG. 1) that receives coded video from the terminal 200. The pre-processor 222 may output pre-processed video to the coding engine 224. In some operating states, the pre-processor 222 may be disabled, in which case, the pre-processor 222 outputs source video to the coding engine 224 without alteration.

The coding engine 224 may perform coding operations on the video data input to it in order to reduce the bandwidth of the video signal. The coding engine 224 may code the video data according to spatial and/or temporal coding techniques, which exploit redundancies in the source video's content. For example, the coding engine 224 may use content of one or more previously-coded "reference frames" to predict content for a new frame to be coded. The coding engine 224 may identify the reference frame(s) as a source of prediction in the coded video data and may provide supplementary "residual" data to improve image quality obtained by the prediction.

Typically, the coding engine 224 operates on a pixel block-by-pixel block basis. That is, an input frame may be parsed into a plurality of pixel blocks—spatial areas of the frame—and prediction operations may be performed for each such pixel block (or, alternatively, for a collection of pixel blocks). The coding engine 224 may operate according to any of a number of different coding protocols, including, for example, MPEG-4, H.263, H.264 and/or HEVC. Each protocol defines its own basis for defining pixel blocks and the principles of the present invention may be used cooperatively with these approaches.

The coding engine 224 may include a local decoder (not shown) to generate decoded video data from the coded video that it generates. The coding engine 224 may designate various coded frames from the video sequence to serve as reference frames for use in predicting content of other frames. The coding engine 224 may decode coded data of the reference frames and assemble decoded reference frames therefrom, then store the decoded reference frames in a local reference frame cache 226. Many predictive coding operations are lossy operations, which causes decoded video data to vary from the source video data in some manner. By decoding the coded reference frames, the video coder 220 stores a copy of the reference frames as they will be recovered by a decoder.

The transmitter 230 may format the coded video data for transmission to another terminal. Again, the coding protocols typically define a syntax for exchange of video data among the different terminals. Additionally, the transmitter 230 may package the coded video data into packets or other data constructs as may be required by the network. Once the transmitter 230 packages the coded video data appropriately, it may release the coded video data to the network 130 (FIG. 1).

The video coder 220 may select various coding parameters based on constraints that may be imposed upon it by a controller 240. For example, the video coder 220 may select coding modes for frames and pixel blocks (for example, selection among inter-coding and intra-coding), quantization parameters and other coding parameters for various portions of the video sequence. The controller 240 may impose constraints on the video coder 220 by selecting, for example, a target bit rate that the coded video must meet, a metric of image quality that must be met when the coded video is decoded. In this manner, the elements of the video coder 220 operate cooperatively with the controller 240.

The terminal 200 may include a display 250 for local display of video. Video to be displayed may be provided from the local video source 210 or may be provided from another terminal 120 (FIG. 1) which is decoded by decoding elements that are not shown in FIG. 2. Additionally, the video to be displayed may be merged with other graphical elements, such as user interface controls that may be overlaid on the video or graphical effects that may be added to the video content to be displayed. Such graphical effects may include filtering of designated content from the video and/or replacing designated content with alternate content. Such video composition operations may be governed by the controller 240.

The terminal 200 also may include various sensors for capture of user commands and other data. Typical sensors may include a motion sensor 260 that generates data from which the terminal's orientation in free space (and, by extension, the terminal's motion) may be determined. Other sensors may include user input elements 270 to detect input of user commands. For example, the terminal 200 may possess buttons, a touch screen sensor, fingerprint sensors, infrared ranging sensors, and microphones among other types of sensors from which to detect user commands. Users may engage buttons to enter designated commands. They may interact with graphical user elements on a touch screen to engage virtual buttons. In other embodiments, users may enter spoken commands to the terminal 200 via a microphone. These sensors are illustrated in FIG. 2 collectively as user input elements 270.

Embodiments of the present invention provide coding techniques for a terminal 200 when zooming transitions occur in source video. Zooming transitions may occur in a variety of ways. Many electronic image capture systems include zoom functions that move lenses and other optical components with respect to an image sensor to alter the image sensor's field of view in free space. In other embodiments, an image capture system may be moved with respect to object(s) to be imaged, usually by changing the distance between the image capture system and the object, to alter the object's representation in video data generated therefrom. Further, an image sensor may have a so-called "digital zoom" function in which an operator at the image capture system commands the system, via a user input element 270, to alter the representation of image content in captured video. That is, an image capture system may generate video data more or less with no alteration of object(s) within the sensor's field of view but a processing stage within the image capture system (or, for example within a pre-processor discussed herein) may scale content within the video data to generate alternate video in which the objects' representations are altered. Further, zoom transitions need not continuously vary the size of image content within image data; for example, zooming transitions also may accommodate panning operations in which, after alteration of the size of image content, image content may translate within the field of view. All such transitions may be considered to have zoom transitions as discussed herein.

Figure 3:
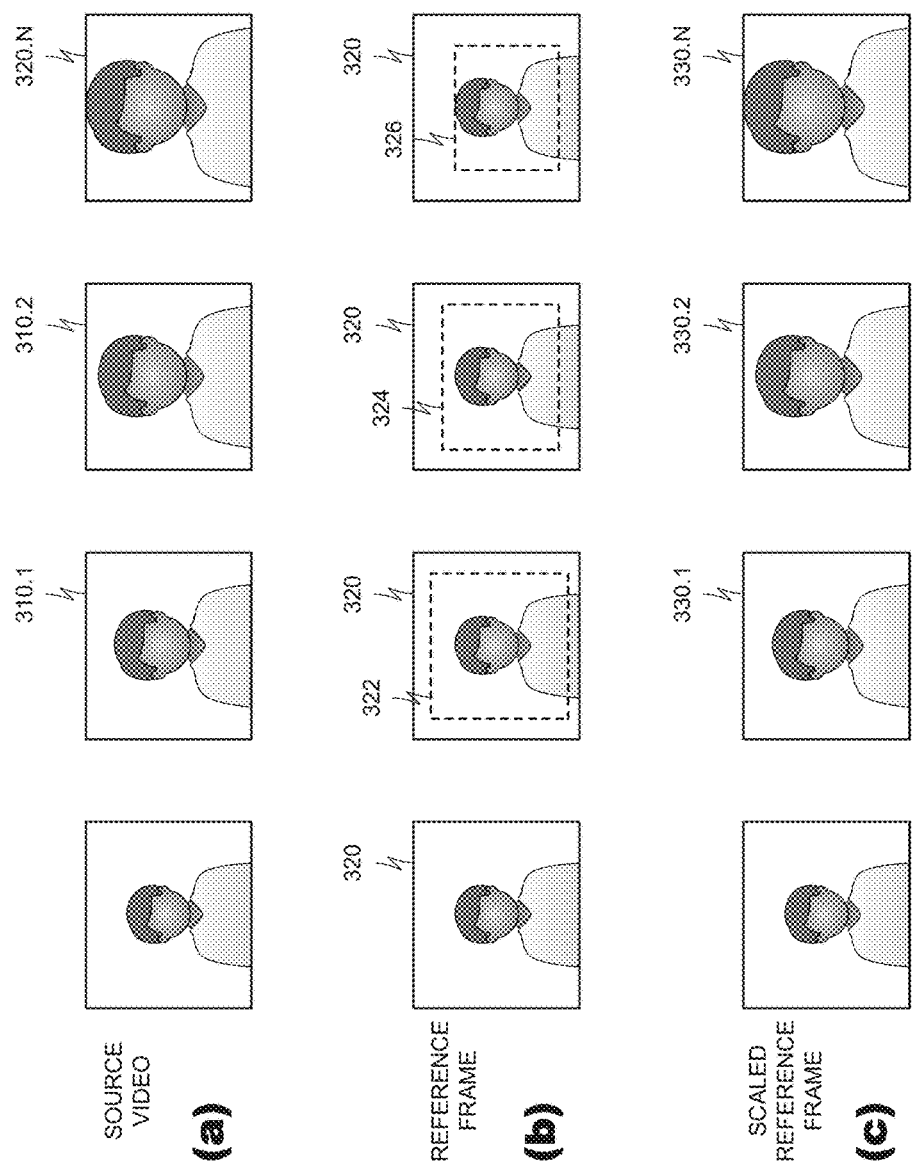
FIG. 3 illustrates exemplary video data and prediction data to be obtained therefrom according to an embodiment of the present invention.

FIG. 3 illustrates processing that may be applied to source video to code it during a zoom operation. As illustrated in FIG. 3(a), a zooming operation may generate a video sequence that includes a plurality of frames 310.1-310.N in which image content changes size across the sequence. In the example of FIG. 3(a), the zoom operation causes image content to increase in size across the frames 310.1-310.N. The video coding operation may code content of these frames 310.1-310.N predictively with reference to a common reference frame 320 illustrated in FIG. 3(b).

FIG. 3(b) illustrates a reference frame 320 that may be used as a basis for prediction of content from the frames 310.1-310.N in FIG. 3(a). During operation, a video coder may scale a portion of content from the reference frame 320 according to a scaling factor to match content of the reference frame to content of the source video. For each frame, the video coder may identify a rectangle 322, 324, 326 that identifies a portion of the reference frame to be scaled for prediction purposes. The video coder also may identify a scaling factor to determine a degree of scaling to be applied to image content in the rectangle.

The video coder may scale reference frame content in the rectangle according to the scaling factor to derive scaled reference frame data for use in prediction. FIG. 3(c) illustrates scaled reference frame data 330.1-330.N that may be derived from the rectangles 322, 324, 326 illustrated in FIG. 3(b).

FIG. 3 illustrates a simplified example in which all image content of a frame from the zooming sequence is predicted from a single reference frame. In practice, prediction operations are performed on a pixel block-by-pixel block basis for a variety of pixel blocks in a frame. Reference frame data for a given frame need not be provided from a single reference frame as illustrated in FIG. 3 but rather may be predicted from a variety of reference frames, with one reference frame serving as a prediction reference for a first pixel block in the frame to be coded and other reference frame(s) serving as prediction references for other pixel blocks of the frame to be coded. The selection of which reference frames serve as a prediction reference for which pixel blocks may be performed by a prediction search algorithm to find content from reference frames that provide the best matches for content of the pixel blocks to be coded.

In one embodiment, to simplify coding operations, the set of reference frames that may serve as prediction references for a frame may be constrained to a limited number (say, two). A video coder may determine a rectangle and scaling factor that identifies video content from the reference frames to be scaled and an amount of scaling to be applied. Such an embodiment may find application in zooming operations where image content is highly correlated to each other, such as in image content that exhibits low motion.

In other embodiments, however, the set of reference frames may be unbounded within constraints that otherwise appear from, for example, the coding protocol being used. When source video exhibits low correlation due to, for example, high degrees of motion content or new video elements appearing suddenly in the zooming sequence, then rectangles and scaling factors may be identified anew for sub-sets of frames to be coded. For example, frames may be parsed into pixel blocks but, depending on the coding protocol being used, multiple pixel blocks may be assembled into larger artifacts such as slices or elements of coding trees. A video coder may apply rectangles and scaling factors at any of these coding levels—pixel blocks, slices or coding tree levels.

FIG. 4 illustrates a coding method 400 according to an embodiment of the present invention that may find application during coding of a frame in a zooming sequence. The method 400 may begin by estimating rectangles and scaling factors to be applied to presently-available reference frames (box 410) then scaling the reference frames according to those rectangles and scaling factors (box 420). The rectangles and scaling factors may vary for each reference frame as may be necessary to scale the reference frame's content to a size of the frame being coded. Thereafter, the method 400 may perform a search to determine if a prediction match may be obtained between pixel blocks of the frame being coded and any of the scaled reference frames (box 430). If a match is possible, the method 400 may code the source pixel block predictively using the scaled reference frame that was identified as a match as a basis of prediction (box 440). The method 400 may output coded data of the pixel block, and prediction information identifying the reference frame and the location of matching content that is to be used as a basis of prediction and data identifying the rectangle and/or scaling factor (box 450). The operations of boxes 430-450 may be repeated for each pixel block of the frame until the entire frame is coded. Thus, identification of rectangles and scaling factors may be provided for multiple coded pixel blocks in the frame to be coded.

It may occur at box 430 that no scaled reference frame provides an adequate match for one or more pixel blocks from the frame being coded. In this case, the source pixel block(s) may be coded according to an alternate coding technique, such as intra-coding (box 460).

In the embodiment of FIG. 4, coding methods 400 may select prediction references from as many reference frames that are stored locally at an encoder as are determined by the prediction search. Reference frames, rectangles and scaling factors may be identified separately for each pixel block being coded. In alternate embodiments, such prediction references may be provided for other sub-elements of a frame to be coded—for example, slices and coding tree elements—rather than pixel blocks. In other embodiments, however, the prediction references may be constrained to some limited number of reference frames that are fewer than the reference frames stored locally at the encoder. Such an embodiment is illustrated in FIG. 5.

FIG. 5 illustrates a coding method 500 according to another embodiment of the present invention. The method 500 may estimate a scaling rectangle and scaling factor to be applied to each of a plurality of reference frames stored locally at an encoder (box 510). It may scale the reference frames according to their respective rectangle and scaling factor (box 520). Thereafter, the method 500 may identify a predetermined number of scaled reference frame(s) that have the highest correlation to the input frame (box 530). Prediction references for the frame to be coded may be limited to this predetermined number of scaled reference frames. The method 500 may include, in the coded video data, data representing reference frame identifiers, rectangles and scaling factors for the scaled reference frames that will be used for prediction (box 540).

Thereafter, the method 500 may code the pixel blocks of the frame to be coded. The method may search, from among the scaled reference frames, content for use in predicting the frame's pixel block (box 550). If an appropriate prediction reference is found, the method may code the pixel block using data from the scaled reference frame as a basis of prediction (box 560). The method 500 may cause data representing the coded pixel block to be included in the coded video data (box 570). If, at box 550, no adequate prediction reference was identified, the method may code the pixel block according to an alternate coding technique, for example, intra-coding (box 580).

Again, although FIG. 5 illustrates prediction references being identified on a pixel block-by-pixel block basis, alternate embodiments of the present invention permit prediction references to be defined at other granularities in a frame, for example, slices and/or coding tree elements.

A variety of syntactic elements may be used to identify prediction references, scaling rectangles and scaling factors. In a simple case, these data elements may be provided expressly in the coded video data each time it is to be communicated to a decoder. In other embodiments, these elements may be communicated impliedly. Consider the example of FIG. 3, where a scaling rectangle 324 is to be rescaled to fit the size of a source frame 310.2. During coding, terminals 110, 120 (FIG. 1) typically exchange session initiation messages that define the size of video frames being coded. A scaling factor may be derived from transmission of data identifying a rectangle 324 by scaling reference frame content that appears in the rectangle 324 to fit the size of source video.

In other embodiments, communication of rectangle identifiers may be performed impliedly. A terminal may provide a motion vector or other data that identifies a location of a pixel block within a reference frame that is to be used for prediction of a pixel block and a scaling factor. Another terminal 120 (FIG. 1) may derive a rectangle to be used for the pixel block from the motion vector data and the scaling factor data. Thus, it may not be necessary in all cases to transmit rectangle data and scaling factor data expressly for all coded video content.

Although embodiments of the present invention find application in zooming operations that affect image capture, causing image content to change size within a video sequence, the principles of the present invention also find application in zooming sequences that are induced by operator command but do not necessarily affect image capture. One such example is illustrated in FIG. 6.

FIG. 6(*a*) illustrates a source video sequence that includes frames 610.1-610.N and zooming rectangles 622-626 selected therefrom. In this case, the zooming rectangles may be selected by user commands entered at the terminal that represent a command to perform a zoom and pan within captured video data. In response to a zoom operation, a terminal 110 may select content within the zooming rectangles for coding and, optionally, for local display.

FIG. 6(*b*) illustrates scaled reference frames 630.1-630.N that may be obtained from the zoom operations illustrated in FIG. 6(*a*). When the zoom rectangles 622, 624, 626 are communicated in the coded video data, a decoder (say, provided at terminal 120 in FIG. 1) may generate prediction data from a reference frame identified by the prediction reference and by the zooming rectangle and scaling factors also identified by the coded video data.

As illustrated in FIG. 6(*b*), a zooming sequence need not include a continuous change in content within video data. Zooming sequences also may include pan operations, which move image content to a new field of video of the video data.

Figure 7:
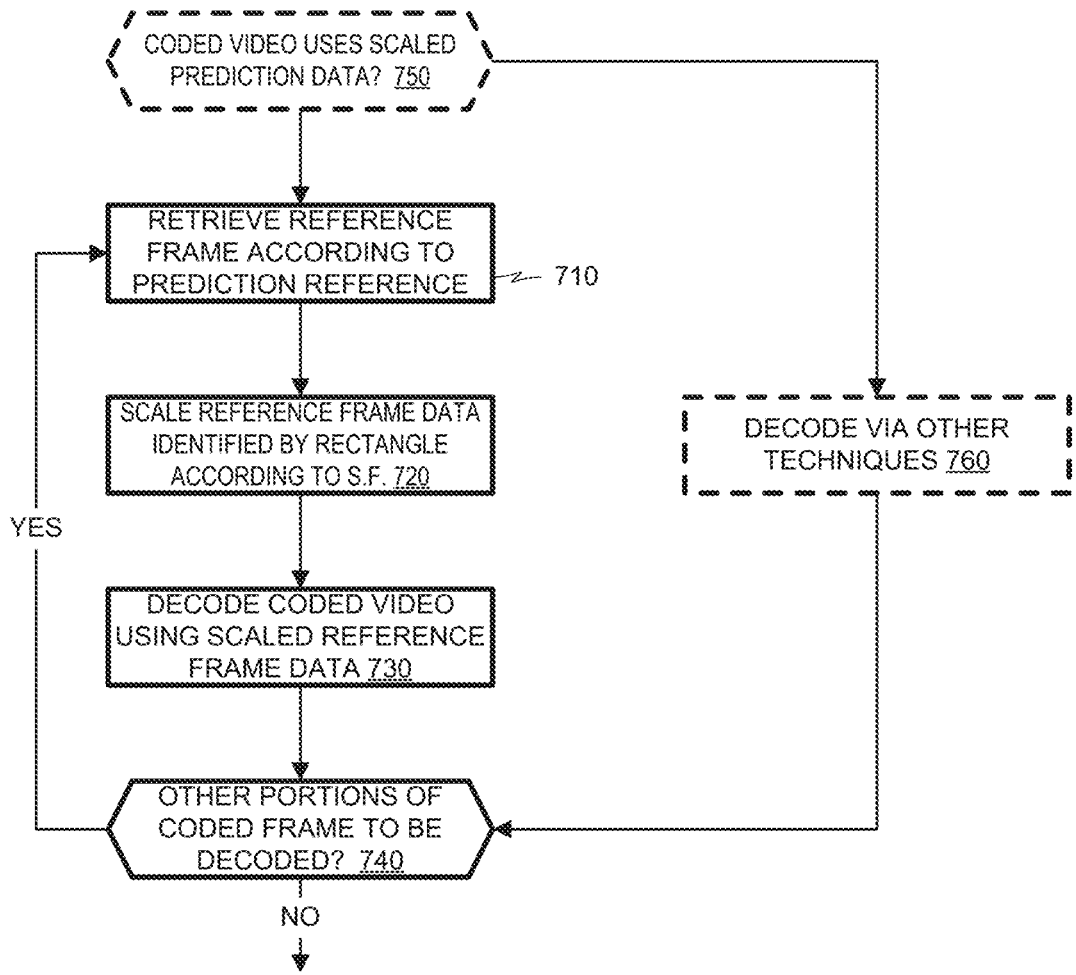
FIG. 7 illustrates a decoding method according to an embodiment of the present invention.

FIG. 7 illustrates a decoding method 700 according to an embodiment of the present invention. The method 700 may begin by retrieving data of a reference frame according to prediction references contained within coded video data (box 710). The method 700 may scale a portion of the reference frame data that falls within a scaling rectangle by a scaling factor identified by the coded video data (box 720). Again, the scaling rectangle and/or scaling factor may be signaled in the coded video data either expressly (by provision of a data field therein) or impliedly (for example, by derivation from other content of the coded video data). Having scaled the reference frame data, the method 700 may decode coded video for a new frame using the scaled reference frame data as a basis of prediction (box 730). Once the decoded video data is available, the method 700 may determine whether other portions of the new frame remain to be decoded (box 740) and, if so, the method 700 may return to box 710 for another iteration of decoding. If no other coded data remains to be decoded, decoding operations for a current frame may conclude.

The method 700 of FIG. 7 is appropriate for use when coding content of a frame that is coded entirely using the predictive coding operations illustrated in the foregoing embodiments. The principles of the present invention find application in coding systems that employ the coding techniques described herein cooperatively with other coding techniques (represented by boxes 750 and 760).

The principles of the present invention also permit application of zooming rectangles to affect coding quality decisions in video coding sessions. An example is shown in FIG. 9. When coding a video sequence that is subject to a digital zoom, a pre-processor 222 (FIG. 2) ordinarily may crop frames of video down to the content that are selected by the zooming operation. According to an embodiment of the present invention, a video coder 220 may apply different coding operations to portions of video that within a zooming region than for other portions of the video that are outside the zooming region.

In another embodiment, an encoder may code updates to portions of scene frames rather than code new scene frames in their entirety. An encoding terminal may parse image data into regions and may perform the designations of significance on a region-by-region basis. In this manner, regions with high levels of significance may be coded as updates at a relatively high frequency but regions with lower levels of significance may be coded less frequently (no not at all).

Figure 8:
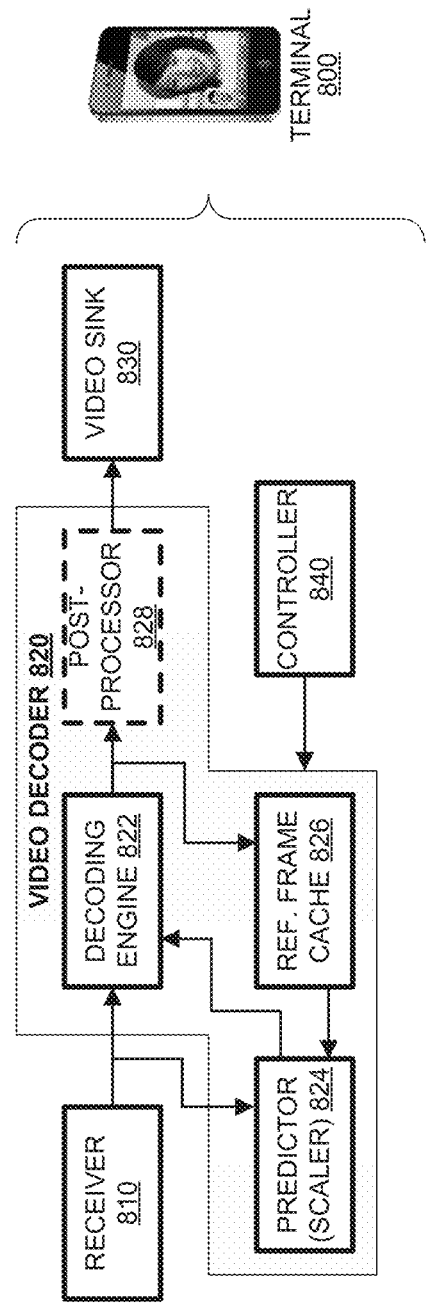
FIG. 8 is a functional block diagram of a terminal according to another embodiment of the present invention.

FIG. 8 is a functional block diagram of a terminal 800 that may perform video decoding according to an embodiment of the present invention. The terminal may include a receiver 810, a video decoder 820, a video sink 830 and a controller 840. The receiver 810 may receive coded data from a communication network 130 (FIG. 1) and may parse the coded data into its constituent elements, for example, distinguishing coded video data from other types of data (e.g., audio, caption data and/or metadata) present therein. The video decoder 820 may decode coded video data to generate reconstructed video data therefrom. The video sink 830 may consume the coded video data, typically by rendering the data on a display or perhaps storing it for later use. The controller 840 may control overall operation of the terminal 800.

The video decoder 820 may include a decoding engine 822, a predictor 824, a reference frame cache 826 and perhaps a post-processor 828. The decoding engine 822 may invert coding operations performed by a coding engine (FIG. 2) of another terminal to generate reconstructed video data from the coded video data. Such coding and decoding operations can be lossy and, therefore, the reconstructed video data may not always match the source video, prior to coding, exactly. Responsive to prediction references contained in the coded video data, the predictor 824 may derive predicted pixel block data to the decoding engine 822 for use in decoding. The predicted pixel block data may be derived from reconstructed reference frames that are stored in the reference frame case. Where zooming transitions occur, the predictor may scale reference frame data contained within zooming rectangles as part of the predictor's derivation. When the decoding engine 822 reconstructs data of a new reference frame, the reconstructed reference frame may be stored in the reference frame cache 826.

The video decoder 820 also may include a post-processor 828 that operates on reconstructed video data. The post-processor 828 may apply signal conditioning operations to the recovered video (e.g., filtering) to improve quality of the recovered video data. Typical post-processing operations may include applying deblocking filters, edge detection filters, ringing filters and the like.

In one embodiment, shown in FIG. 9(*a*), an encoder may code the entire field of view of video frames that are designated as reference frames. Video content within a zooming rectangle 912 may be coded at high quality (typically, with the lowest quantization parameters available under current operation conditions) and video content outside the zooming rectangle 912 may be coded at lower quantity (e.g., with higher quantization parameters). The encoder may provide metadata identifying the location of the zooming rectangle 912 within the reference frame. Thereafter, other reference frames may be predicted with reference to the zooming rectangle.

If, as shown in FIG. 9(*b*), a zooming transition occurs that includes content outside the zooming rectangle 912 of the reference frame 910, the encoder and decoder may code such content with reference to a coarse representation of that content as represented in the reference frame 910. Thus, additional content of frames 920.1-920.*n* may be coded predictively although predictions that use data drawn from outside the zooming rectangle 912 may not provide as precise a prediction as predictions that use data drawn from inside the zooming rectangle 912.

In another embodiment, shown in FIG. 9(*c*), an encoding terminal may second two classes of reference frames. A first reference frame 930 may represent cropped video data according to a digital zoom process. Zoomed reference frames 930 may be used as sources of prediction for other frames in a video sequence.

A second class of reference frames, called "scene frames" for convenience, may represent uncropped video data—e.g., the entire field of view presented to a video coder. In such an embodiment, a scene frame typically would not be used as a reference for prediction for video data until a zooming transition occurs. Moreover, it typically would not be displayed by a decoder after it is decoded. Instead, the scene frame may be stored in a reference frame cache 226 (FIG. 2) until referenced by an encoder during coding (e.g., when the encoder recognizes a zoom transition).

Scene frames, because they are not displayed, need not be transmitted to a decoder with the same quality of service as other frames. Transmission of coded scene frame data may be multiplexed with other elements of coded video data and typically will be transmitted to a decoder with lower priority than those other elements. Thus, if the encoding terminal 110 experiences bandwidth constraints imposed by a network 130 (FIG. 1), the encoding terminal may suspend or terminate transmission of scene frame data. Moreover, an encoder may choose timing of coding of scene frames based on bandwidth available in a network; an encoder may choose to code a scene frame after determining that network conditions likely can accommodate extra bandwidth that transmission of the coded scene frame will entail.

Additionally, content of scene frames as stored in reference frame caches 226, 826, may be updated with decoded content of other reference frames. If a new reference frame 930 is received and decoded while a decoded scene frame 940 sits in a reference frame caches, the decoded reference frame 930 may be scaled down based on a degree of zoom and overwrite corresponding portions of the decoded scene frame 940.

An encoding terminal also may designate the significance of changes to a scene frame and order them for transmission according to ranking. Designations of significance may be based on a difference metric that estimates magnitude of differences between a new frame and a previously-stored scene frame or based on a mean squared error estimate between the new frame and the previously-stored scene frame. Alternatively, designations of significance may be based on an structural similarity measure taken between a new frame and a previously-stored scene frame.

Moreover, designations of significance may be weighted based on a distance of changed data (between the new frame and a previously-coded scene frame) from current zoomed area. Alternatively, designations of significance may be weighted based on a distance of changed data (between the new frame and a previously-coded scene frame) distance from an identified face in the image content.

The encoder may vary the timing of coding of scene frames based on a significance estimates.

The block diagrams of FIGS. 2 and 8 illustrate functional units that may operate to perform video coding and video decoding operations respectively. As noted, many terminals support bi-directional exchange of coded video data. In such applications, a single terminal may include the functional blocks of both FIGS. 2 and 8. The terminal may include video coding components as illustrated in FIG. 2 to capture data locally and code it for delivery to another terminal. The terminal may include video decoding components as illustrated in FIG. 8 to decode video data that was captured by another terminal and render it locally on the terminal's display. Accordingly, the functional units illustrated in FIGS. 2 and 8 may operate cooperatively during a common communication session.

The foregoing discussion has described operation of the embodiments of the present invention in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video coding method, comprising:
   responsive to detection of a zooming transition in source video, estimating scale factors and zooming rectangles between respective potential reference frames and a new frame, wherein the potential reference frames and the new frame correspond to different frames of source video;
   scaling content of the potential reference frames according to the respective zooming rectangles and scale factors to produce scaled potential reference frames;
   identifying a selected reference frame corresponding to the scaled potential reference frame having a highest correlation to the new frame to be coded;
   transmitting, to a decoder, an indication of the selected reference frame, the selected reference frame's respective scale factor, and the selected reference frame's respective zooming rectangle;
   coding content of the new frame by, for each pixel block of the new frame:
      searching for a prediction reference for the pixel block from within the selected reference frame and not searching within other scaled potential reference frames;
      if a prediction reference is found for the pixel block, predictively coding the pixel block using the prediction reference as a source of prediction;
      otherwise, coding the pixel block according to an alternate technique that does not use another reference frame as a source of prediction; and
      transmitting, to a decoder, the predictively coded pixel block.

2. The method of claim 1, wherein the content of the new frame being coded is a pixel block.

3. The method of claim 1, wherein the content of the new frame being coded corresponds to content of a frame at an intermediate node of a coding tree.

4. The method of claim 1, wherein the content of the new frame being coded corresponds to content of a detected object in the source video.

5. The method of claim 1, wherein the scale factor is transmitted expressly in a coded video bit stream.

6. The method of claim 1, wherein the scale factor is identified in a coded video bit stream by implied signaling.

7. The method of claim 1, wherein the zooming rectangle is transmitted expressly in a coded video bit stream.

8. The method of claim 1, wherein the zooming rectangle is identified in a coded video bit stream by implied signaling.

9. A video coding method, comprising:
   responsive to detection of a zooming transition in source video, estimating scale factors and zooming rectangles between respective potential reference frames and a new frame, wherein the potential reference frames and the new frame correspond to different frames of source video;
   scaling content of the potential reference frames according to the respective scale factors and zooming rectangles to produce scaled potential reference frames;
   identifying a predetermined number of selected reference frames having scaled content with highest correlations to the new frame to be coded;
   transmitting, to a decoder, an indication of the selected reference frames, respective scale factors, and respective zooming rectangles;
   coding content of the new frame by, for each pixel block of the new frame:
      searching for a prediction reference for the pixel block from within the selected reference frames and not searching within other scaled potential reference frames;
      if a prediction reference is found for the pixel block, predictively coding the pixel block using the prediction reference as a source of prediction;
      otherwise, coding the pixel block according to an alternate technique that does not use another reference frame as a source of prediction; and
      transmitting, to a decoder, the predictively coded pixel block.

10. The method of claim 9, wherein the content of the new frame being coded is a pixel block.

11. The method of claim 9, wherein the content of the new frame being coded corresponds to content of a frame at an intermediate node of a coding tree.

12. The method of claim 9, wherein the content of the new frame being coded corresponds to content of a detected object in the source video.

13. The method of claim 9, wherein the scale factor is transmitted expressly in a coded video bit stream.

14. The method of claim 9, wherein the scale factor is identified in a coded video bit stream by implied signaling.

15. The method of claim 9, wherein the zooming rectangle is transmitted expressly in a coded video bit stream.

16. The method of claim 9, wherein the zooming rectangle is identified in a coded video bit stream by implied signaling.

17. A video coder, comprising:
   a coding engine to code source video predictively with reference to locally-stored reference frame data,
   a reference frame cache to store reference frame data,
   a scaling unit to scale content stored in the reference frame cache and supply it to the coding engine for use in the predictive coding, and
   a controller to:
      determine when a zooming transition occurs in the source video,
      identify scale factors and zooming rectangles between respective potential reference frames and a new frame, wherein the potential reference frames and the new frame correspond to different frames of source video,
      cause the scaling unit to scale content in the potential reference frames according to the respective zooming rectangle and scaling factors to produce scaled potential reference frames,
      identify a selected reference frame having a highest correlation to the new frame to be coded;
   coding content of the new frame by, for each pixel block of the new frame:
      searching for a prediction reference for the pixel block from within the selected reference frames and not searching within other scaled potential reference frames;
      if a prediction reference is found for the pixel block, predictively coding the pixel block using the prediction reference as a source of prediction;
      otherwise, coding the pixel block according to an alternate technique that does not use another reference frame as a source of prediction; and provide, in a bit stream carrying coded video data, the predictively coded pixel block and provide an indication of the selected reference frame, respective scale factor, and respective zooming rectangle.

18. A non-transitory storage medium storing program instructions that, when executed by a processing device, cause the processing device to code video by:
responsive to detection of a zooming transition in source video, estimating scale factors and zooming rectangles between respective potential reference frames and a new frame, wherein the potential reference frames and the new frame correspond to different frames of source video;
scaling content of the potential reference frames according to the respective zooming rectangles and scale factors to produce scaled potential reference frames;
identifying a selected reference frame from amongst the potential reference frames having a highest correlation to the new frame to be coded;
transmitting, to a decoder, an indication of the selected reference frame, respective scale factor, and respective zooming rectangle;
coding content of the new frame by, for each pixel block of the new frame:
searching for a prediction reference for the pixel block from within the selected reference frame and not searching within other scaled potential reference frames;
predictively coding the pixel block using the prediction reference as a source of prediction; and
transmitting, to a decoder, the predictively coded pixel block.

19. The method of claim 9, wherein the number of selected reference frames is less than a total number of stored reference frames.

20. The video coding method of claim 1, wherein the selected reference frame is a scene frame used as a source for predictive coding but not intended to be output from the video decoder.

21. The video coding method of claim 1, wherein detection of a zooming transition is based on receiving input from a motion sensor associated with the source video.

22. The video coding method of claim 1, wherein detection of a zooming transition is based on a receiving user input command for digital zoom of an image capture system.

23. The video coding method of claim 9, wherein at least one of the selected reference frames is a scene frame used as a source for predictive coding but not intended to be output from the video decoder.

24. The video coding method of claim 9, wherein detection of a zooming transition is based on receiving input from a motion sensor associated with the source video.

25. The video coding method of claim 9, wherein detection of a zooming transition is based on receiving a user input command for digital zoom of an image capture system.

26. The coder of claim 17, wherein detection of a zooming transition is based on receiving input from a motion sensor associated with the source video.

27. The coder of claim 17, wherein detection of a zooming transition is based on receiving a user input command for digital zoom of an image capture system.

28. The non-transitory storage medium of claim 18, wherein the instructions for detection of a zooming transition are include instructions for receiving input from a motion sensor associated with the source video.

29. The non-transitory storage medium of claim 18, wherein the instructions for detection of a zooming transition are include instructions for receiving a user input command for digital zoom of an image capture system.

* * * * *